June 3, 1958  C. L. ASHBROOK  2,837,353
THIN-WALL PIPE COUPLING WITH PRESSURE ACTUATED
LOCKING GASKET
Filed Feb. 3, 1954  2 Sheets-Sheet 1

Clifford L. Ashbrook
INVENTOR.

BY James F. Weiler &
Jefferson D. Giller
ATTORNEYS

June 3, 1958 C. L. ASHBROOK 2,837,353
THIN-WALL PIPE COUPLING WITH PRESSURE ACTUATED
LOCKING GASKET
Filed Feb. 3. 1954 2 Sheets-Sheet 2
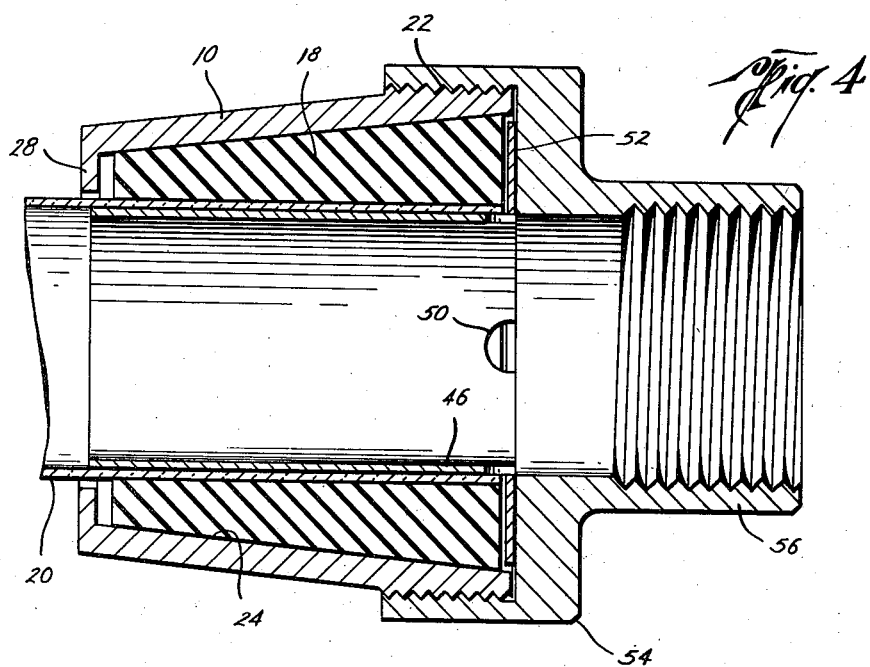
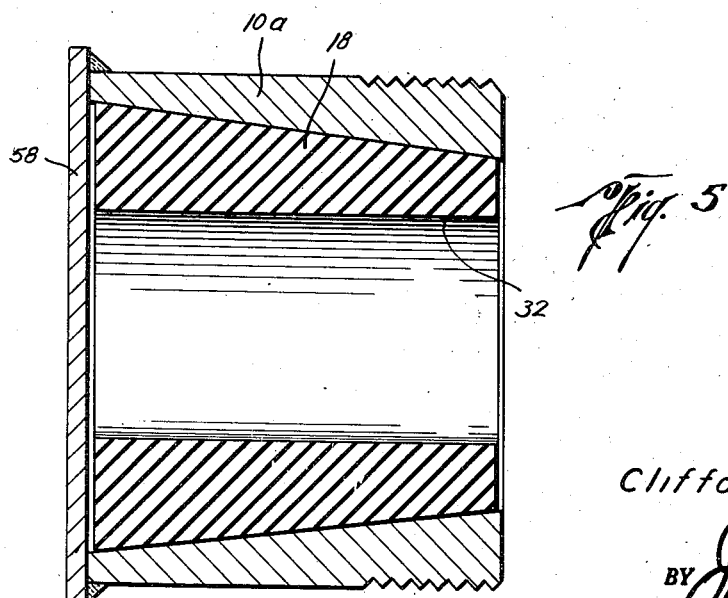
Clifford L. Ashbrook
INVENTOR.
ATTORNEYS

United States Patent Office 2,837,353
Patented June 3, 1958

2,837,353

THIN-WALL PIPE COUPLING WITH PRESSURE ACTUATED LOCKING GASKET

Clifford L. Ashbrook, Houston, Tex., assignor to Henry T. Chamberlain, Evanston, Ill., trustee Application February 3, 1954, Serial No. 408,004

4 Claims. (Cl. 285—106)

This invention relates to couplings and especially to couplings for plastic, glass, other non-metallic pipes and tubes and thin-molded metallic piping, tubing and the like.

Considerable difficulty has been encountered in attempting to provide a means for satisfactorily joining the ends of tubing and pipes that are not adapted to be threaded, such as thin-walled metallic tubing and pipes and tubing and pipes formed of non-metallic material, such as glass, plastic, and the like. In general, the present couplings are not satisfactory inasmuch as many involve complicated gluing and forming operation, and, in the case of some tubes and pipes there is no satisfactory means for coupling them together.

It is, therefore, a general object of the present invention to provide a coupling for coupling together tubing and pipe formed of material which cannot be or is difficult of threading coupling elements thereto, the elements of which coupling may be secured to ends of such tubing and pipe readily and easily and provide a durable and reliable coupling irrespective of the material from which the tubing or pipe is formed.

It is another object of this invention to provide a pipe and tube coupling of the above character in which the gripping and sealing of an end thereof may be accomplished by a single packing member.

It is yet another object of this invention to provide such a coupling which includes means for preventing collapse of the tubing or pipe ends during use.

Figure 1:
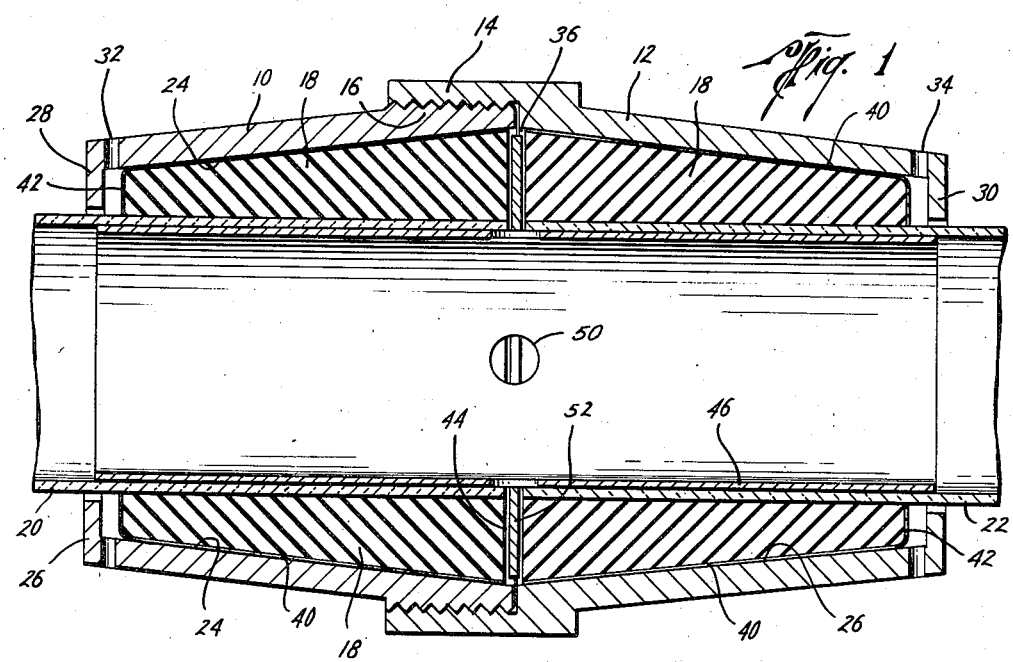
Figure 2:
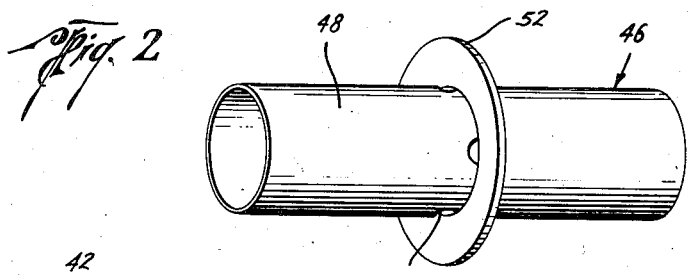
Figure 3:
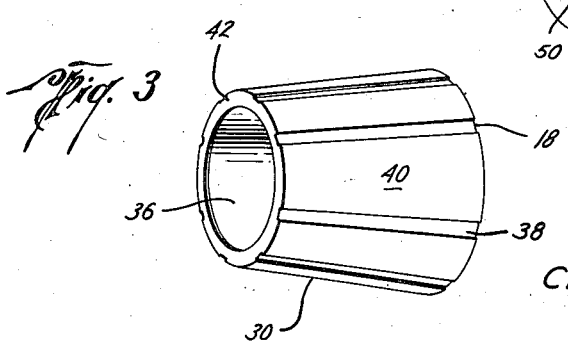

Other objects and advantages will be more apparent from the following detailed description of preferred examples of the invention, given for the purpose of disclosure and taken in conjunction with the accompanying drawings, where like references refer to like parts throughout the several views, and where, Fig. 1 is a side elevation, in section, of a tube or pipe coupling constructed in accordance with the present invention, Fig. 2 is a perspective view of a tube or pipe support member, Fig. 3 is a perspective view of a packing member and illustrating means to assure sliding movement to the packing for deforming and compressing the packing into gripping and sealing engagement with a pipe or tube end, Fig. 4 is a side elevation, in section, of a tube and pipe coupling constructed in accordance with the present invention for coupling a tube or pipe to a pipe or tube having a threaded end, and Fig. 5 is a side elevation, in section, illustrating the invention as cap for capping free ends of pipe or tubing.

Referring now to the drawings, and particularly to Figs. 1, 2 and 3, it can be seen that the tube coupling as a whole when used for connecting two tubes includes a first coupling body element 10 which may be threadedly or otherwise secured to a second coupling body element 12, such as by the threaded box 14 and pin 16. The two coupling body elements 10 and 12, of course, may be secured together in any satisfactory manner, such as by bayonet, safety threads, and the like, or the two coupling body elements 10 and 12 may be integral, if desired.

Packing member 18 is provided in each of the two coupling body elements 10 and 12 and each is adapted to internally receive the tube ends 20 and 22 as subsequently explained in more detail, the action of the packing members 18 against the tube ends 20 and 22 both grips and seals these ends.

The exterior shape of the body coupling elements 10 and 12 may be as desired. For economy, it may follow the configuration of the guide surfaces 24 and 26 which are oppositely directed and taper inwardly in the direction of their outer ends. These guide surfaces 24 and 26 may take the form of truncated conical bores, as illustrated, and, in effect, comprises slip bowls.

At the outer end of each body coupling element 10 and 12, means are provided to stop outward movement of the packing 18 to prevent the packing from being squirted out of these elements by fluid pressure, as will be apparent later. This may take the form of an inwardly turned shoulder 28 and 30. One or more ports 32 and 34 may be provided in the coupling body elements 10 and 12, respectively, to permit escape of fluid pressure which might collect between the packing rings 18 and the shoulder 28 and 30 and which would interfere or restrict the desired movement and action of the packing 18.

Packing members 18 are best seen in Fig. 3 and one such member is shown there. This member is provided with an axially extending cylindrical bore 36 which snugly receives the tube ends and has a slide surface 38 which is complementary to and slides on the guide surfaces 24 and 26 of the body coupling elements 10 and 12. In order to assure sliding movement of the packing members 18 in the coupling body elements 10 and 12, a slide 40 formed of slidable material, such as metal, slick plastics and the like may be positioned about the slide surface 38. Preferably the slide 40 is split axially into segments to permit contraction as the packing 18 is compressed. The slide 40 may, of course, be omitted. The ends of the packing 18 comprises annular faces 42 and 44 and the packing member 18 may be formed of any yieldable deformable material so that it might be compressed into sealing and gripping engagement with the tube ends 20 and 22. The amount of flow of the packing member, the pressure conditions and material flowing in the tubes, the sizes of the elements are all variables to be considered when selecting the material. For most uses rubber, neoprene and the like are satisfactory.

In coupling together lengths of pipes formed of frangible material or material which would be crushed by the action of the packing 18, a tube support 46 may be used, which is best illustrated in Figures 1 and 2. The tube support 46 may include a tubular section 48 formed of relatively strong material, such as steel, various metals, reinforced plastics and the like and should be strong enough to withstand pressure of the order used. The tubular section 48 fits inside the tube ends 20 and 22 and thus support them from crushing and other damage. Disposed at the central portion of the tubular section 48 are a plurality of circumferentially spaced ports 50 to permit passage of fluid pressure in the tubes 20 and 22 to be brought to bear against the annular faces 44 of the packings 18 and the latter compressed into sealing and gripping engagement with the tube ends 20 and 22. An annular spacing member 52 is disposed about the tubular section 52 which properly spaces the tube support 46 in the body elements 10 and 12.

When it is desired to couple together lengths of tubes which are formed of glass, plastic, thin-walled sections and the like, the packing 18 is disposed in the coupling body elements 10 and 12 and the tube support, when necessary or desired, is placed inside the pipe ends 20 and 22, which latter have been worked into the bores 36 of the packings 18. When coupling elements 10 and 12 are not integral and may be secured together, the pipe ends 20 and 22 may be slipped through the coupling elements 10 and 12, respectively, the packing 18 slipped over their ends and drawn into the coupling elements. The tube support 46 may be inserted into one pipe end and in the other pipe end as the coupling elements are threaded together.

When in use, fluid pressure in the tubes 20 and 22 is brought to bear against the annular faces 44 of the packing 18 through the ports 50 in the tube support 46. This causes the packing to be compressed and causes it to flow or be deformed in a direction outwardly of the ends of the coupling elements 10 and 12. Due to the configuration of the guide and slide surfaces 24, 26 and 38, respectively, the packing is expanded radially inwardly and frictionally and sealingly engages and grips the exterior surfaces of the pipe ends 20 and 22. By providing the packing 18 of enough length and the taper to the guide and slide surfaces, as just mentioned, in connection with the deformable and ability to flow characteristics of the packing 18, considerable wedging and gripping action is obtained on the tube ends 20 and 22. Very little surface is provided on the inner annular end faces of the tubes 20 and 22 and, hence, more force is applied by the packing 18 in gripping the tubes than tending to squirt or blow the tubes out of the coupling.

In the use of the tube coupling shown in Fig. 1 it will be found that under certain flow conditions and with certain types of tubing the tube support member 46 is not necessary and may be entirely omitted.

The stop shoulders 28 and 30 prevent the packing 18 to be blown out of the ends of the coupling elements; although, by utilizing packings 18 formed of suitable materials for the pressure conditions utilized, these stop shoulders may be omitted. In using the stop shoulders 28 and 30, however, the ports or breather holes 32 and 34 are desirable to permit escape of any entrapped fluids which would interfere with the action of the packing 18.

The embodiment of the invention shown in Fig. 4 is used when tubing 20 is to be coupled to other tubing or pipe which is threaded and it is desired to take advantage of these threads. In this embodiment everything utilized in coupling body element 10 as illustrated in Fig. 1 is also used in that of Fig. 4 but instead of a second body 12 and its respective components, a box and pin fitting 54 is used which has complementary threads 22 as did coupling body member 12 and which also has pin member 56 adapted to be threadedly secured to the threaded pipe, not shown. Of course, instead of this box and pin member 44 some other type of connection such as a sleeve, bayonet or other connection could be used.

Fig. 5 illustrates a cap constructed according to the invention. Here the parts are the same but a disk-like closure member 58 is welded or otherwise secured to the large end of the coupling body 10a. The mode and manner of use is the same as described in connection with the other examples of the invention and no more description is deemed necessary.

From the foregoing description it is apparent that the tube coupling of the present invention provides a coupling by which tube ends may be both gripped and sealed by a packing element which is compressed and deformed into sealing and gripping engagement with the exterior walls of the tube or pipe ends.

Thus, the present invention is well-suited to carry out the objects and attain the advantages mentioned, as well as others inherent therein.

In the appended claims, the pipes are specified as coupled in end to end relation. It will be understood that this does not necessarily specify axially, but may be secured together at an angle to the axis of each other, such as in conventional elbows, T's, bends, curves and the like.

Numerous changes in details and arrangements of parts will therefore suggest themselves to those skilled in the art which are encompassed in the spirit of the invention and the scope of the appended claims.

What is claimed is:

1. In a coupling for pipe, the combination comprising, a hollow body having a frusto-conical internal guide surface formed by a correspondingly shaped chamber communicating with one end of said body, said guide surface diverging from said one end of said body, an elongated deformable packing element mounted within said chamber and provided with a cylindrical axial bore throughout its length for snugly receiving an end portion of the pipe, plural slide members mounted on the exterior of said packing element and having an exterior slide surface complementary to and slidably engageable with said guide surface, said packing element having a generally annular face at its axially innermost end within said body, a pipe support comprising a tubular section insertable concentrically within the end of the pipe and the bore of said packing element for aligning said pipe coaxially within said body, a spacing member extending radially outward from the said tubular section adjacent said annular face of the packing element and engageable with an internal wall of said body, and port means formed in said tubular section communicating with said annular face of the packing element for transmitting pressure of fluids carried within said pipe to said packing element, such pressure serving to force said packing element axially along said guide surface toward the converging end of the latter to cause such to grip said pipe end portion and to effect a fluid tight seal with the latter and said guide surface.

2. In a coupling for pipe, the combination comprising, a hollow body having a pair of frusto-conical internal guide surfaces formed by correspondingly shaped opposed chambers communicating with opposite ends of said body, said guide surfaces each diverging radially from the ends of said body, a pair of elongated deformable packing elements mounted within said body, one in each of said chambers and each provided with a cylindrical axial bore throughout its length for snugly receiving an end portion of a pipe, plural slide members mounted on the exterior of each of said packing elements and presenting an exterior slide surface complementary to and slidably engaged with one of said guide surfaces, a generally annular face at the axially innermost end of each of said packing elements within said body, a pipe support means comprising a tubular section insertable concentrically within the ends of pipe received in the respective bores of said packing elements for aligning said pipe ends coaxially within said body, a spacer member extending radially outward from the said tubular section between said annular faces of said elements and engageable with an internal wall of said body, and port means formed in said tubular member communicating with said annular face of each of said packing elements for transmitting pressure of fluids carried within said pipe to said packing elements, such fluid pressure serving to force said packing elements in opposite axially directions toward the converging ends of said guide surfaces and cause the same to compressibly grip said pipe end portions and to effect fluid tight seals with the latter and the associated guide surface.

3. The coupling of claim 2 wherein said body comprises a pair of coupling body portions, each provided with one of said guide surfaces and one of said packing elements, and means for securing said coupling body portions together.

4. The coupling of claim 2 including stop means adjacent the outer extremities of said body for limiting axial movement of said packing elements.

(References on following page)

References Cited in the file of this patent

UNITED STATES PATENTS

| | | |
|---|---|---|
| 865,497 | Kenyon | Sept. 10, 1907 |
| 906,849 | Baashuus | Dec. 15, 1908 |
| 1,282,959 | Sears | Oct. 29, 1918 |
| 1,888,539 | Otterson | Nov. 22, 1932 |
| 1,959,630 | Keitel | May 22, 1934 |
| 2,046,597 | Abegg | July 7, 1936 |
| 2,226,304 | Dillon | Dec. 24, 1940 |
| 2,470,883 | Boissou | May 24, 1949 |
| 2,562,359 | Iredell | July 31, 1951 |